United States Patent
Koenig et al.

(10) Patent No.: US 6,830,531 B1
(45) Date of Patent: Dec. 14, 2004

(54) CONTROL STRATEGY FOR LOAD SHARING BETWEEN A FRICTION CLUTCH AND ONE-WAY CLUTCH TO EFFECT LOW AND REVERSE GEAR RATIOS IN A TRANSMISSION

(75) Inventors: Melissa Koenig, Howell, MI (US); R. Keith Martin, Imlay City, MI (US); John M. Kremer, Sterling Heights, MI (US)

(73) Assignee: BorgWarner, Inc., Auburn Hills, MI (US)

( * ) Notice: Subject to any disclaimer, the term of this patent is extended or adjusted under 35 U.S.C. 154(b) by 0 days.

(21) Appl. No.: 10/627,419

(22) Filed: Jul. 24, 2003

(51) Int. Cl.$^7$ .................................................. F16H 3/62
(52) U.S. Cl. ................................ 475/263; 475/318
(58) Field of Search ............................. 475/119, 257, 475/263, 318

(56) References Cited

U.S. PATENT DOCUMENTS

| | | | |
|---|---|---|---|
| 4,653,348 A | * 3/1987 | Hiraiwa | 475/276 |
| 5,069,656 A | * 12/1991 | Sherman | 475/276 |
| 5,152,726 A | 10/1992 | Lederman | 475/324 |
| 5,250,011 A | * 10/1993 | Pierce | 475/276 |
| 5,584,776 A | 12/1996 | Weilant et al. | 475/213 |
| 5,806,643 A | 9/1998 | Fitz | 192/45.1 |
| 5,823,909 A | * 10/1998 | Beim et al. | 475/269 |
| 5,830,102 A | * 11/1998 | Coffey | 475/285 |
| 5,918,715 A | 7/1999 | Ruth et al. | 192/46 |
| 5,928,104 A | * 7/1999 | Kimura et al. | 475/318 |
| 6,000,510 A | 12/1999 | Kirkwood et al. | 192/3.29 |
| 6,062,361 A | 5/2000 | Showalter | 192/38 |
| 6,095,941 A | * 8/2000 | Martin et al. | 475/318 |
| 6,109,410 A | 8/2000 | Costin | 192/46 |
| 6,186,299 B1 | 2/2001 | Ruth | 192/46 |
| 6,210,300 B1 | 4/2001 | Costin et al. | 475/294 |

* cited by examiner

Primary Examiner—Richard M. Lorence
(74) Attorney, Agent, or Firm—Bliss McGlynn, P.C.; Greg Dziegielewski

(57) ABSTRACT

Pursuant to the control strategy of the present invention, torque load may be shared between the low/reverse friction clutch and a one-way clutch to effect low and reverse gear ratios in a transmission. This may be accomplished by engaging the friction clutch during vehicle launch and keeping it engaged until the peak torque has passed. Once the peak torque has been passed, the load capacity of the friction clutch can be reduced to zero. In this operational mode, the one-way clutch is acting to support the remaining drive torque. Thus, with only the one-way clutch carrying a load at the time of the up-shift from first to second gear, a non-synchronous shift can be affected. In this way, the control strategy acts to share the torque load between the low/reverse brake and the low one-way clutch, thereby allowing a reduced capacity, lower spin-loss one-way clutch design.

5 Claims, 2 Drawing Sheets

CONTROL STRATEGY FOR LOAD SHARING BETWEEN A FRICTION CLUTCH AND ONE-WAY CLUTCH TO EFFECT LOW AND REVERSE GEAR RATIOS IN A TRANSMISSION

BACKGROUND OF THE INVENTION

1. Field of the Invention

The present invention relates, generally, to a transmission shifting control strategy and, more specifically, to a control strategy for load sharing between a friction clutch and one-way clutch to effect low and reverse gear ratios in a transmission.

2. Description of the Related Art

Generally speaking, land vehicles require three basic components. These components include a power plant (such as an internal combustion engine), a power train and wheels. The power train's main component is typically referred to as the "transmission." Engine torque and speed are converted in the transmission in accordance with the tractive-power demand of the vehicle. Transmissions include one or more gear sets which may include an inner gear, intermediate planet or pinion gears which are supported by their carriers, and outer ring gears. Various components of the gear sets are held or powered to change the gear ratios in the transmission. In addition to such planetary gear sets, driveline components may further include multi-disc friction devices that are employed as clutches or brakes. The multi-disc pack clutch is a friction device that is commonly employed as a holding mechanism in a transmission.

The multi-disc pack clutch or brake assembly has a clutch sub-assembly including a set of plates and a set of friction discs that are interleaved between one another. The plates and friction discs are bathed in a continual flow of lubricant and in "open pack" operation normally turn past one another without contact. The clutch or brake assembly also typically includes a piston. When a component of a gear set is to be held, as for example during a particular gear range, a piston is actuated so as to cause the plates and friction discs to come in contact with respect to one another. In certain applications, it is known to employ several multi-disc pack clutch devices in combination to establish different drive connections throughout the transmission to provide various gear ratios in operation, or to brake a component.

When the discs are not engaged, there often remains a differential rotational speed of the drive and driven members which the clutch or brake bridges. Relative rotation between the friction discs and the plates during open-pack mode creates drag. This condition results in parasitic energy losses, reduces the efficiency of the transmission, and ultimately results in lower fuel efficiency.

In addition to multiple friction devices, one-way clutches are frequently employed in transmissions to selectively transmit torque in one rotational direction, but not in the opposite rotational direction. To this end, one-way clutches typically include an inner race, an outer race, and an engagement mechanism disposed therebetween. The engagement mechanism is operable to lock the inner and outer races together thereby transmitting torque in one relative direction. The engagement mechanism is further operable to allow freewheeling rotation between the inner and outer races in the opposite rotational direction. Engagement mechanisms commonly used in one-way clutches of the related art include pawls, sprags, and rollers. A cage, along with biasing members, such as springs, are also sometimes employed to retain the pawls, sprags, or rollers between the inner and outer races as well as to selectively assist in the change of operational modes between torque translation and freewheeling actuation of the clutch, depending on the direction of rotation between the inner and outer races.

As noted above, one-way clutches of this type have been employed in numerous applications in transmission, transfer cases, and differentials. For example, one-way clutches have been employed in conjunction with multiple friction clutches and planetary gear sets to effect low and reverse gear ratios in conventional transmissions. While this arrangement has worked well for its intended purpose, some disadvantages remain. For example, the friction clutch remains a source of significant parasitic losses due to inherent drag between the friction plates when the clutch is operating in "open pack" mode. Still, the clutch is necessary for providing the proper holding torque in low and reverse gears. Accordingly, there remains a need in the art for a shift control strategy that activates the friction clutch to provide the appropriate holding torque for both low and reverse gears in the transmission and yet yields lower manufacturing costs and space requirements than those presently attributable to the one way clutch and multiple plate friction clutch currently used for this purpose. In addition, there is a need in the art for a control strategy that provides for a non-synchronous up-shifting from first to second gear may be effected.

SUMMARY OF THE INVENTION

The disadvantages of the related art are overcome in a transmission shifting control strategy for load sharing between a low friction clutch and a one-way clutch to provide low and reverse gears in a transmission. The control strategy includes a method of controlling an automotive transmission having at least one shaft and at least one gear set operatively coupled to the shaft and adapted to provide low and reverse gear ratios. The gear set includes a sun gear operatively coupled to a source of torque in the transmission assembly, a ring gear mounted for rotation about the sun gear and a plurality of pinion gears supported by a carrier for meshing rotation about the sun gear and between the ring gear and the sun gear. The carrier is operatively coupled to the shaft. In addition, the transmission has a friction clutch assembly including a clutch pack that acts as a holding device and as well as a one way clutch assembly that is interposed between the friction clutch assembly and the gear set. The method includes the steps of selecting a low gear ratio that is provided by the gear set. The friction clutch is actuated to ground the outer race of the one-way clutch assembly and thus the ring gear to the transmission housing. Torque is provided to the sun gear to drive the pinion gears in meshing relationship about the sun gear to transfer torque at a reduced ratio to the carrier and therefore the shaft. Activation of the friction clutch is maintained until the peak torque transmitted through the gear set has been reached. In addition, the method of the present invention includes reducing the load capacity of the friction clutch assembly while the transmission assembly is still in the low gear ratio defined by the gear set and so that the one way clutch assembly acts as the sole holding device on the ring gear of the gear set such that a non-synchronous shift from the low gear to the high gear may be effected.

In this way, the control strategy may be employed to provide load sharing between a friction clutch and a one-way clutch to provide low and reverse gear ratios. The control strategy may result in a reduced capacity one-way clutch that yields lower manufacturing costs and has reduced space requirements when compared to one-way clutches known in the related art. When used in this way, the control strategy results in smooth non-synchronous up-shift from first to second gears.

Other objects, features and advantages of the present invention will be readily appreciated as the same becomes better understood after reading the subsequent description taken in connection with the accompanying drawings.

DETAILED DESCRIPTION OF THE PREFERRED EMBODIMENT(S)

Figure 1:
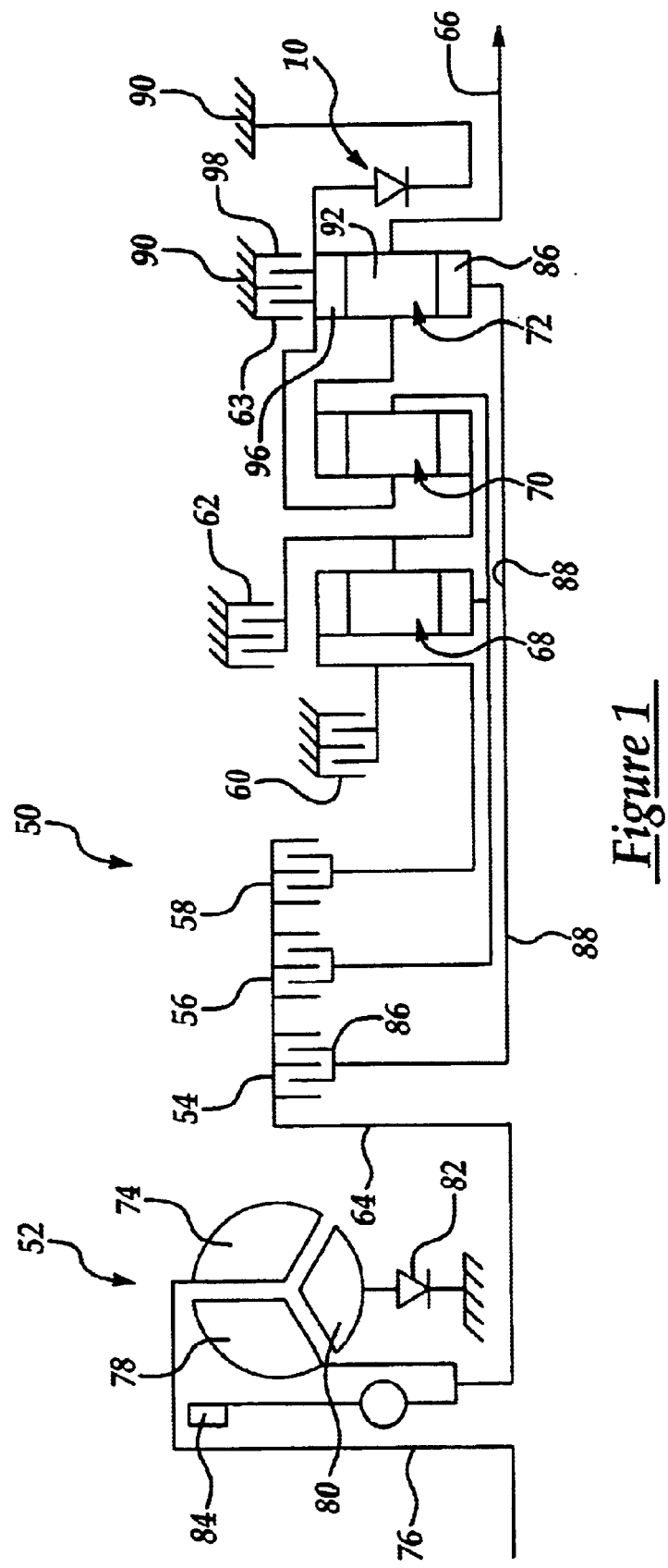
FIG. 1 is a schematic diagram depicting a transmission illustrating a low friction clutch and one-way clutch to provide low and reverse gear ratios.
Figure 2:
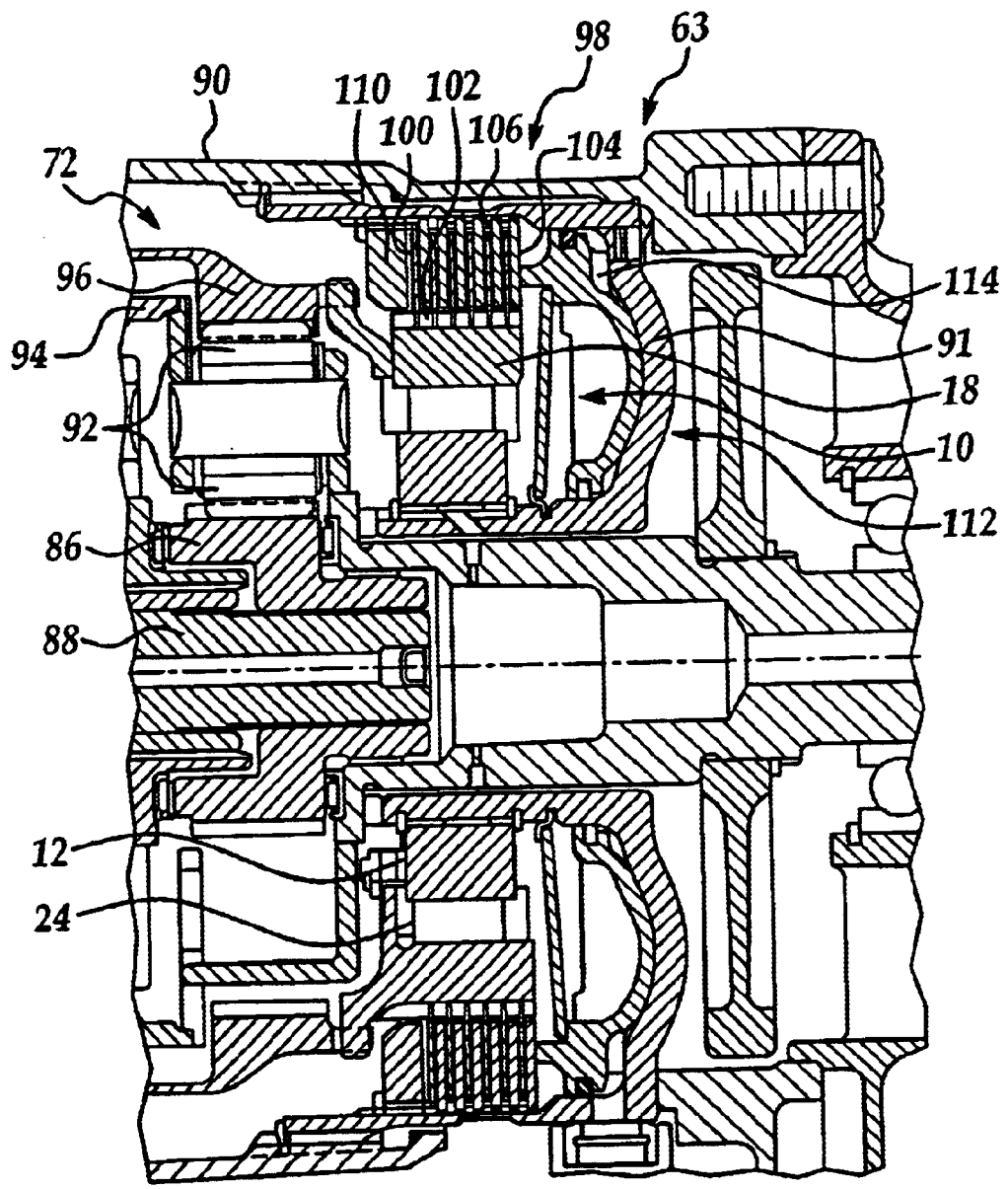
FIG. 2 is a schematic representation of the friction clutch, one-way clutch and a planetary gear set to provide low and reverse gear ratios in the transmission of FIG. 1.

The control strategy of the present invention will be described in connection with a transmission which is schematically illustrated in FIGS. 1 and 2. However, those having ordinary skill in the art will appreciate that the control strategy of the present invention may be employed in numerous applications in a transmission.

One representative example of an advantageous use of the control strategy of the present invention is shown in connection with a transmission, schematically illustrated at 50 in FIG. 1. The transmission 50 has a number of conventional components that are arranged to translate torque between a prime mover, such as an internal combustion engine (not shown) and the output of the transmission at various gear ratios. However, those having ordinary skill in the art will appreciate that the standard components of a transmission may be arranged in numerous ways to provide various gear ratios. Thus, the exact configuration of these components form no part of the present invention and are only discussed to better illustrate the salient features of the control strategy of the present invention.

To this end, the transmission 50 includes a torque converter, generally indicated at 52, and a plurality of multi-plate friction disc clutches 54, 56, 58, 60, 62, 63 or similar mechanisms that serve as holding mechanisms or brakes to translate torque between the primary transmission input shaft 64 and the primary transmission output shaft 66 acting through a plurality of planetary gear sets 68, 70, and 72, as is commonly known in the art. The torque converter 52 includes an impeller assembly 74 operatively connected for rotation with the torque input member 76 from the internal combustion engine. A turbine assembly 78 is fluidly connected in driven relationship with the impeller assembly 74. The torque connector also includes a stator assembly 80. These assemblies together form a substantially toroidal flow passage for kinetic fluid in the torque converter 52. Each assembly includes a plurality of blades or vanes that act to convert mechanical energy into hydrokinetic energy and back to mechanical energy. The stator assembly 80 of a conventional torque converter is locked against rotation in one direction but is free to spin about an axis in the direction of rotation of the impeller assembly 74 and the turbine assembly 78. A one-way clutch 82 is often employed for this purpose. When the stator assembly 80 is locked against rotation, the torque is multiplied by the torque converter. During torque multiplication, the output torque is greater than the input torque for the torque converter 52. In addition, conventional torque converters often employ clutches 84 interposed between the torque input member 76 and the turbine assembly 78 which are engaged and "lock up" at higher speed ratios (speed output over speed input). When the clutch 84 is locked up, there is a direct torque translation between the torque input member 76 and the transmission 50 through the turbine assembly 78.

In the particular transmission 50 illustrated in FIG. 1, an underdrive clutch 54, overdrive clutch 56, reverse clutch 58, fourth gear brake 60, second gear brake 62 and a low/reverse gear brake 63 are employed as holding mechanisms to translate torque from the primary transmission input shaft 64 to various ones of the planetary gear sets 68, 70, and 72, as the case may be. In turn, each of the planetary gear sets include a sun gear operatively coupled to one of the clutches identified above, a ring gear disposed about the respective sun gear, and a plurality of pinion or planetary gears disposed in meshing relationship between the respective sun and ring gears.

In the representative embodiment illustrated herein, a one-way, overrunning clutch assembly 10 is employed in connection with the planetary gear set 72 and the low/reverse gear brake 63 which together provide low and reverse gear ratios. This application is illustrated in FIG. 2. The one-way clutch may be of any conventional type including an inner race, generally indicated at 12, and an outer race, generally indicated at 18, disposed concentrically about the inner race 12. Engagement members, generally indicated at 24, are disposed between the inner and outer races. The inner race 12 may include a plurality of torque translating teeth disposed about the circumference of the outer diameter of the inner race. The outer race may include a plurality of cavities or camming surfaces that are formed circumferentially about the inner diameter of the outer race. The engagement members may be supported within the cavities of the outer race and between the inner and outer races 12, 18, respectively. The engagement members may include pawls, sprags, or rollers. In addition, the engagement members may include a cage, along with biasing members, such as springs, to retain the pawls, sprags, or rollers between the inner and outer races, 12, 18 as well as to selectively assist in the change of operational modes between torque translation and freewheeling actuation of the clutch, depending on the direction of rotation between the inner and outer races, 12, 18, respectively.

For example, the one-way clutch may be operated to provide torque translation in one direction and may freewheel in the opposite direction. In this case, torque is provided from the underdrive clutch 54 to the sun gear 86 that is splined to the shaft 88. For a low gear, the outer race 18 is grounded to the transmission case 90 through the low one-way clutch 10 and the low/reverse gear brake 63. To this end, the low/reverse gear brake 63 includes an annular clutch pack, generally indicated at 98, which is illustrated in FIG. 2. The clutch pack 98 is interposed between the outer race 18 and the transmission case 90 through a clutch housing 91. Thus, the clutch pack 98 operates to connect and disconnect the outer race 18 of the clutch assembly 10 and the transmission case 90 for translating and interrupting torque therebetween. The clutch pack 98 includes a number of annular friction plates 100 splined at 102 to the outer race 18. A plurality of annular discs 104 are splined at 106 to the friction clutch housing 91 and interleaved between the plates 100. The plates 100 and friction discs 104 are also axially movable relative to their respective spline, outer race, and clutch housing to come into frictional engagement, thereby reducing or eliminating relative rotation between the plates 100 and discs 104. A pair of retaining rings are typically mounted to the clutch housing 91 and are disposed on either side of the clutch pack 98. A backing plate 110 may also be employed to cooperate with the retaining ring to limit axial movement of the plates 100 and friction discs 104.

Axial movement of the adjacent plates and friction discs is achieved through the actuation of a piston assembly, generally indicated at 112, which is supported in the clutch housing 91. The piston assembly 112 and the clutch housing 91 cooperate to define an expandable chamber 114 between the piston assembly 112 and the clutch housing 91. A source of pressurized fluid is in communication with the expandable chamber 114 via any suitable means. The piston assembly 112 is responsive to the pressure of fluid in the expandable chamber 114 to move between disengaged and engaged positions thereby actuating the clutch pack 98 to connect and disconnect the outer race 18 of the clutch assembly 10 with the transmission case 90 via the clutch housing 91. The outer race 18 is also operatively connected to the ring gear 96.

In low gears, the brake 63 is engaged and input torque is thus geared down through the pinion gears 92 supported on the carrier 94 and from the carrier 94 to the transmission output shaft 66. In this way, a low gear ratio is effected at the output shaft 66 of the transmission 50. On the other hand, when the brake 63 is released, the clutch 10 is capable of freewheeling in the opposite rotational direction.

When reverse gear is selected, the reverse clutch 58 is engaged and torque is translated to the ring gear 96 of the gear set 72 through the gear sets 68 and 70. In this operational mode, the clutch 10 carries no torque. The friction brake 63 provides the reaction torque for gear set 72. In the remaining gears 2–4 of the transmission illustrated in FIG. 1, the clutch 10 freewheels.

Pursuant to the control strategy of the present invention, in low gear torque load may be shared between the low/reverse friction clutch 63 and the low one-way clutch 10. This may be accomplished by engaging the friction clutch 63 during vehicle launch and keeping it engaged until the peak torque has passed. Once the peak torque has been passed, the load capacity of the friction clutch 63 can be reduced to zero. More specifically, the piston assembly 112 may be moved to its disengaged position allowing the adjacent plates and friction discs to separate. In this operational mode, the one-way clutch 10 is acting to support the remaining drive torque. Thus, with only the one-way clutch 10 carrying a load at the time of the up-shift from first to second gear, a non-synchronous shift can be effected. In this way, the control strategy may be employed to provide load sharing between a friction clutch and a one-way clutch to provide low and reverse gear ratios. The control strategy may result in a reduced capacity one-way clutch that yields lower manufacturing costs and has reduced space requirements when compared to one-way clutches known in the related art. When used in this way, the control strategy results in smooth non-synchronous up-shift from first to second gears.

The invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

We claim:

1. A method of controlling an automotive transmission having at least one shaft, at least one gear set operatively coupled to the shaft and adapted to provide low and reverse gear ratios where the gear set includes a sun gear operatively coupled to a source of torque in the transmission assembly, a ring gear mounted for rotation about the sun gear and a plurality of pinion gears supported by a carrier for meshing rotation about the sun gear and between the ring gear and the sun gear with the carrier operatively coupled to the shaft, a friction clutch assembly having a clutch pack that acts as a holding device and a one way clutch assembly interposed between the friction clutch assembly and the gear set, said method including the steps of:

selecting a low gear ratio provided by the gear set;

actuating the friction clutch to ground the outer race of the one way clutch assembly and thus the ring gear to the transmission housing;

providing torque to the sun gear to drive the pinion gears in meshing relationship about the sun gear to transfer torque at a reduced ratio to the carrier and the shaft;

maintaining activation of the friction clutch assembly until the peak torque transmitted through the gear set has been reached; and reducing the load capacity of the friction clutch assembly while the transmission assembly is still in the low gear ratio defined by the gear set and so that the one way clutch assembly acts as the sole holding device on the ring gear of the gear set such that a non-synchronous shift from the low gear to the high gear may be effected.

2. The method of controlling an automotive transmission as set forth in claim 1 wherein the friction clutch is actuated to ground the outer race of the one way clutch assembly and thus the ring gear to the transmission housing during vehicle launch.

3. The method of controlling an automotive transmission as set forth in claim 1 wherein the step of reducing the load capacity of the friction clutch assembly includes the step of releasing the friction clutch assembly such that the clutch pack is disengaged.

4. The method of controlling an automotive transmission as set forth in claim 1 further including the step of shifting the transmission assembly to a higher gear.

5. The method of controlling an automotive transmission as set forth in claim 4 wherein the step of shifting the transmission to a higher gear includes shifting the transmission from first gear to second gear.

* * * * *